July 7, 1953  D. C. SEWELL  2,644,922
MAGNETIC FLUX DIRECTION DETERMINING APPARATUS
Filed Jan. 5, 1951
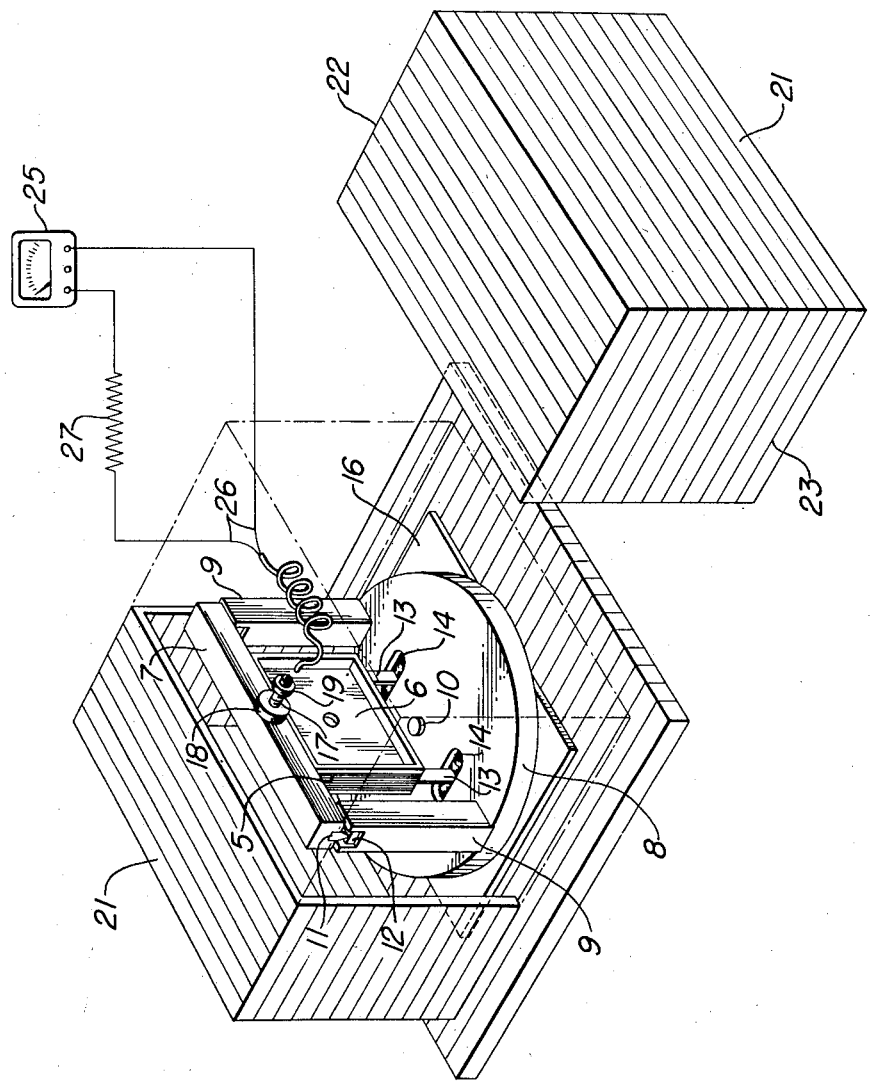
INVENTOR.
DUANE C. SEWELL
BY
ATTORNEY.

Patented July 7, 1953

2,644,922

UNITED STATES PATENT OFFICE 2,644,922

MAGNETIC FLUX DIRECTION DETERMINING APPARATUS

Duane C. Sewell, Concord, Calif., assignor to the United States of America as represented by the United States Atomic Energy Commission Application January 5, 1951, Serial No. 204,670

4 Claims. (Cl. 324—47)

The present invention relates to the precise determination of magnetic flux direction and presents a novel method and means of quickly and accurately determining the direction of magnetic lines of force.

Accurate measurements of magnetic fields are commonly made in laboratories where extensive and cumbersome apparatus may be employed; however, only rough checks are ordinarily necessary or possible with mobile apparatus. With the advent of modern electrical and especially electronic equipment, there has arisen a need for instruments which will provide very accurate field measurements and further characterized by simplicity, ruggedness and portability. This is particularly true in the construction and operatioon of particle accelerators which occupy a position of increasing importance as a result of the recent emphasis upon nuclear research and associated production of radioactive materials, and which in many instances require exact control of included magnetic fields. For example, it has been determined that particles in a synchrotron oscillate about a surface which is near the median plane of the magnet gap and the exact disposition of this plane may be determined from a knowledge of the direction of the magnetic lines of force and the variation of the magnetic field with radius. The present invention is adapted to determine the direction of magnetic lines of force with the extreme precision required in such an application.

It is, therefore, an object of the present invention to provide an improved method and means for precisely determining the direction of magnetic lines of force.

It is another object of the present invention to provide a magnetic flux direction determining device which is simple, rugged, and portable.

It is another object of the present invention to provide improved means for determining the direction of magnetic flux in the presence of an electrostatic field.

It is a further object of the present invention to provide an improved magnetic flux direction determining device having mechanical damping.

It is still another object of the present invention to provide an improved null method and means employing same for precisely determining the direction of magnetic lines of force.

Numerous additional objects and advantages of the invention will become apparent to those skilled in the art from the following disclosure of the invention taken together with the attached drawing in which the sole figure illustrates the mechanical configuration of a preferred embodiment of the invention together with a schematic representation of associated electrical equipment.

Referring to the drawing it will be seen that there is provided a coil 5 consisting preferably of many turns of fine copper wire wound about a core 6 in such a manner that the coil is relatively short axially. Coil 5 is attached to a cross bar 7 which extends in a direction which is normal to the axis of coil 5 and beyond the extremities thereof. There is also provided a base member 8, which may consist of a flat circular element as shown, and a pair of posts 9 attached to the base 8 and extending therefrom at a distance from each other. Coil 5 is suspended above base 8 by means of cross bar 7 which extends over posts 9. Contact between cross bar 7 and posts 9 is preferably confined to a relatively frictionless pivot surface such as a knife edge and for this purpose there is illustrated knife edge inserts 11 which are secured to cross bar 7, and cooperating bearing surfaces on a pair of inserts 12 which are secured to the top of posts 9. By the above arrangement coil 5 is mounted for facile displacement about a line passing substantially along the top thereof; it will be appreciated, however, that any one of many different suspension arrangements would be suitable for this purpose.

In order to prevent oscillation of the coil or spurious motion thereof, there is provided a mechanical damping arrangement which includes a pair of vanes 13 secured to the bottom of coil 5 and extending therefrom toward base member 8. Cooperating with vanes 13 are a pair of indentations 14 in the upper surface of base 8, into which vanes 13 extend and which contain a liquid such as oil, as shown. The vanes 13 and attached coil 5 are retarded in any motion externally imparted thereto by the resistance encountered by vanes 13 passing through the surrounding liquid in reservoirs 14 and thus motion of coil 5 is effectively damped by this means; however, it will be apparent that various other damping arrangements may be employed if desired.

In addition to the above-noted latitude of motion of coil 5, which consists solely of rotation about a line substantially in coincidence with the top center thereof, the entire assembly may be rotatably or pivotally mounted. This may be accomplished by the provision of a plate 16 disposed adjacent and below base member 8 and having a pivot pin 10 protruding upwardly therefrom and mating with an aperture centrally disposed in base member 8, whereby rotation of base 8 may be easily effected.

In order to adjust the position of coil 5 so that its axis is horizontal, there is provided an adjustable offset weight arrangement which may include a threaded lug 17 secured to cross bar 7 and extending horizontally therefrom in substantial parallelism with the axis of coil 5. Upon lug 17 there is threaded a weight 18 which may be secured in desired position by a lock nut 19 upon lug 17. By varying the position of weight 18 on lug 17 the center of gravity of coil 5 and cross bar 7 is changed and in this manner coil 5 may be disposed absolutely vertical, from which position readings are obtained as set forth below.

Commonly, measurements of magnetic fields must be accomplished in the presence of electrostatic fields of greater or less intensity. Interference even from weak electrostatic fields are sufficient to disturb the accuracy of magnetic field measurements obtained by the present invention and there is therefore provided shielding means by which electrostatic field influences are excluded from the vicinity of coil 5. Illustrated in the drawing in such a shielding arrangement which may consist of a box 21 that may be opened for facile access to the instrument within, as for example by removing a major wall portion of the box, as shown. Box 21 completely surrounds and encloses the magnetic field measuring instrument shielded thereby and may be secured by any suitable means to plate 16 for convenience. Owing to the enveloping nature of box 21, it is necessary that it not in any way interfere with the magnetic flux to be measured by the instrument therein and this is accomplished by constructing box 21 from an organic material such as polystyrene which has a permeability substantially equal to one (i. e., the same as air or vacuum through which the magnetic field is to be measured). Upon box 21 there is deposited a thin layer of electrically conducting material 22 such as a colloidal silver preparation which effectively terminates any ambient electrostatic fields and prevents extension thereof into the interior of box 21. This silver deposit is scribed with lines 23 which limit the individual expanses of conducting material so that eddy currents are minimized and interference therefrom substantially eliminated.

Precise measurement of magnetic fields by means such as the present invention which is adapted to be disposed within the field to be measured requires that the instrument itself does not distort or affect the magnetic flux. This is accomplished in the present invention by constructing all elements thereof of materials which have substantially the same magnetic permeability as air or vacuum. The coil 5 may be wound of copper wire and the remaining elements formed of an organic material, such as for example polystyrene, while knife edges 11 and surfaces 12 may be formed of some harder material such as the material commercially available under the name of "Lavite." While there exists a wide latitude of suitable materials, care should be exercised in their selection since difficulty may well be encountered through the use of ferromagnetic materials which tend to distort the magnetic field to an appreciable extent.

Signals generated in coil 5 in the measurement of magnetic fields may be indicated by any one of a variety of measuring instruments, such as for example current, voltage or charge indicating devices, or visual indicating means of the cathode ray type. As an example, there is shown in the drawing a galvanometer 25 which is disposed at a distance from coil 5 and associated elements and preferably outside the magnetic field being measured. Meter 25 is electrically connected across coil 5 by electrical conductors 26 which are preferably uniformly twisted and left slack in order that no torque will be exerted on the coil thereby. In addition there may be provided in the measuring circuit current limiting means such as a resistor 27 for the purpose of preventing overly large current flow through coil 5 that would produce a torque, as such a torque would introduce an error in the system.

Operation of the invention is best explained with reference to a particular application thereof and reference is thus made to the above-noted measurement of the magnetic field in a synchrotron. As already stated these measurements are made to determine the location within the field where the flux lines are vertical or most nearly so and for such measurements the mode of operation of the invention may be conveniently considered as consisting of two phases. The first of these phases consists of adjustment of the apparatus and is accomplished as follows. With box 21 open and the apparatus disposed in a field free region, weight 18 is adjusted inwardly or outwardly on lug 17 until coil 5 is exactly vertical, or in other words until the axis of coil 5 is horizontal. Any one of the numerous methods may be employed to check the verticality of coil 5; however, unless very precise measurements are required a mere visual check may be sufficient. With weight 18 adjusted as desired, lock nut 19 is tightened against weight 18 to maintain the setting, and here again if very precise measurements are contemplated a second adjustment may be made to compensate for the movement of lock nut 19. Coil 5 being thus properly disposed and weight 18 secured, reservoirs 14 are filled to insure the above-noted damping action and box 21 is closed about coil 5 and associated elements. With these adjustments accomplished phase one is complete and the apparatus is ready for use in the particular test identified above.

Phase two of the method of operation which consists of obtaining the desired data is accomplished by disposing box 21 and contents within the time varying magnetic field of a synchrotron whose magnetic field is to be measured and with the axis of coil 5 perpendicular to the particle beam path. The magnetic field passes through box 21 and coil 5; however, only the horizontal components of the field affect coil 5. The time variations of the magnetic field induce a voltage in coil 5 by virtue of the horizontal components of the field linking the coil and this voltage is indicated on attached meter 25. By virtue of the shielding afforded by enveloping box 21 neither stray air currents nor adjacent electrostatic fields affect coil 5 and thus the voltage induced therein is a true measure of the horizontal component of the magnetic field. In the measurements under consideration the box 21 and coil 5 are moved about in the magnetic field until a zero reading is indicated on meter 25 at which point the magnetic lines of force or magnetic flux is exactly vertical. This procedure is repeated about the circumference of the synchrotron orbit and the exact location of the vertical magnetic flux determined over the entire synchrotron orbit.

The present invention is particularly advantageous in the recited application and has, in fact, proven able to detect a change in the direction of flux lines of 0.0006 radian. Further, in the illustrated application, it is not necessary to obtain an exactly perpendicular relationship between the coil 5 and the beam path for the voltage induced in coil 5 is proportional to the cosine of the angle between the axis of the coil and the beam path. Although particularly adapted for the illustrated application, the invention is also admirably suited for a variety of other applications relating to the measurement of the direction of magnetic lines of force.

While the present invention has been disclosed with reference to but a single embodiment, it will be apparent to those skilled in the art that numerous modifications may be made within the spirit and scope of the invention and thus no limitation is intended except as defined in the following claims.

What is claimed is:

1. Magnetic flux direction determining apparatus disposed in a varying magnetic field and comprising a flat coil having a much larger diameter than axial length and being pivotally mounted at the circumference thereof to hang vertically, means for varying the center of gravity of said coil to vary the vertical position thereof, mechanical damping means attached to said coil and damping motion thereof, an electrostatic shield enveloping said coil and comprising an electrically conducting material having a magnetic permeability substantially the same as air, and voltage indicating means connected across said coil for indicating the voltage induced therein.

2. Magnetic flux direction determining apparatus disposed in a varying magnetic field and comprising a vertically disposed pancake coil, a bar secured to the top of said coil and perpendicular to the axis thereof, support means including a pair of upstanding posts, a pair of knife edges secured to the bottom of said bar and resting upon said posts whereby said coil is limitedly rotatable about its top through a vertical position, a weight secured to said coil at an adjustable distance therefrom whereby said coil is vertically positionable, and indicating means electrically connected across said coil for indicating voltage induced therein by said magnetic field.

3. Magnetic flux direction determining apparatus as set forth in claim 2 further defined by said support including an open liquid reservoir and vanes secured to said coil and extending downwardly therefrom into said reservoir whereby motion of said coil is damped.

4. Magnetic flux direction determining apparatus as set forth in claim 2 further characterized by said bar and support consisting of an organic material having a magnetic permeability substantially equal to one and said coil consisting of an electrically conducting material having a magnetic permeability substantially equal to one whereby the ambient magnetic field is undistorted.

DUANE C. SEWELL.

References Cited in the file of this patent

UNITED STATES PATENTS

| Number | Name | Date |
|---|---|---|
| 1,672,328 | Loth | June 5, 1928 |
| 1,852,769 | Collard | Apr. 5, 1932 |
| 1,943,850 | Truman | Jan. 16, 1934 |
| 2,151,627 | Vacquier | Mar. 21, 1939 |
| 2,161,192 | Peterson | June 6, 1939 |
| 2,420,580 | Antes | May 13, 1947 |
| 2,451,819 | Frosch | Oct. 19, 1948 |
| 2,558,972 | McLaughlin et al. | July 3, 1951 |